(12) United States Patent  
Fischer (10) Patent No.: US 7,439,734 B2
(45) Date of Patent: Oct. 21, 2008

(54) ROTARY ENCODER AND METHOD FOR ITS OPERATION

(75) Inventor: Peter Fischer, Rimsting (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 12/033,459

(22) Filed: Feb. 19, 2008

(65) Prior Publication Data

US 2008/0197838 A1    Aug. 21, 2008

(30) Foreign Application Priority Data

Feb. 16, 2007    (DE) ........................ 10 2007 007 764

(51) Int. Cl.
*G01B 7/30* (2006.01)
*G01R 33/07* (2006.01)
*G01R 33/09* (2006.01)

(52) U.S. Cl. ............................ 324/207.25; 324/207.2; 324/207.21; 324/251; 324/252

(58) Field of Classification Search ......... 324/173–174, 324/207.2, 207.21, 207.25, 251–252; 73/514.16, 73/514.31, 514.39
See application file for complete search history.

(56) References Cited

U.S. PATENT DOCUMENTS 4,380,928 A * 4/1983 Iwasaki ................. 324/207.25
2008/0079422 A1    4/2008 Tiemann

* cited by examiner

*Primary Examiner*—Bot LeDynh
(74) *Attorney, Agent, or Firm*—Kenyon & Kenyon LLP (57) ABSTRACT

A rotary encoder includes a first group of components and a second group of components. The first group of components has a pulse wire, a detector, and a circuit configuration. The second group of components has a magnet and a code element. Upon approach of the magnet to the pulse wire, a voltage pulse is able to be generated by the pulse wire. A signal is able to be generated by the detector as a function of the relative position, and based on the signal, a logic circuit is able to ascertain position information which is able to be stored in a non-volatile memory. Triggered by the voltage pulse, a voltage from a voltage source is able to be applied to the circuit configuration. The circuit configuration is disconnectable again from the voltage source at the latest after the storage of the position information in the memory.

20 Claims, 6 Drawing Sheets

ROTARY ENCODER AND METHOD FOR ITS OPERATION

CROSS-REFERENCE TO RELATED APPLICATIONS

The present application claims priority to Application No. 10 2007 007 764.7, filed in the Federal Republic of Germany on Feb. 16, 2007, which is expressly incorporated herein in its entirety by reference thereto.

FIELD OF THE INVENTION

The present invention relates to a rotary encoder for determining relative angular positions and to a method for its operation.

BACKGROUND INFORMATION

Rotary encoders are often used for determining the angular position of two machine parts rotatable relative to each other, and operate according to an inductive measuring principle, for example. In inductive rotary encoders, exciter windings and receiver windings are applied, for instance, in the form of printed conductors on a shared printed circuit board that is fixedly joined, e.g., to a stator of the rotary encoder. Centered opposite this printed circuit board at a defined axial distance is a further printed circuit board taking the form of a code element or preferably an annular code disk, on which in periodic intervals, electrically conductive and non-conductive areas are applied in alternation as graduation regions or graduation structures, and which is fixedly joined to the rotor of the rotary encoder. When an electric exciter field alternating in time is applied to the exciter windings, signals are generated in the receiver windings during the relative rotation between rotor and stator as a function of their relative position, thus, as a function of the relative angular position. These signals are then further processed in evaluation electronics.

Such rotary encoders are often used as measuring devices for electric drive systems, to determine the absolute angular position of corresponding drive shafts.

German Published Patent Application No. 10 2006 046 531 describes an inductively operating rotary encoder in which a mode economizing on current is able to be arranged using a special pulsing regime.

SUMMARY

Example embodiments of the present invention provide a rotary encoder, e.g., an inductive rotary encoder, the current consumption of which is minimized in a predefined operating mode.

According to example embodiments of the present invention, the rotary encoder includes a first group of components and a second group of components, the two groups of components being disposed in a manner allowing rotation relative to each other about an axis. The first group of components has a pulse wire (also referred to as a Wiegand wire), at least one detector, as well as an electronic circuit configuration including a logic circuit and a non-volatile memory. The second group of components has a magnet and at least one code element. Upon approach of the magnet to the pulse wire due to a corresponding relative movement of rotation, a voltage pulse is able to be generated by the pulse wire. Moreover, a signal is able to be generated by the at least one detector as a function of the relative position of the code element with respect to the detector, position information being ascertainable by the logic circuit based on the signal, and this information being able to be stored in the non-volatile memory. The first group of components is configured such that, triggered by the occurrence of the voltage pulse, a voltage from a voltage source is able to be applied to the circuit configuration, and the circuit configuration is disconnectable again from this voltage source at the latest after the storage of the position information in the non-volatile memory.

A system of this kind provides that the rotary encoder only consumes energy from the voltage source for ascertaining and storing the position information when a rotational motion actually takes place. The voltage source may be accommodated directly in the rotary encoder, e.g., in the first group of components, or externally, so that the electrical energy supplied by the voltage source is able to arrive in the rotary encoder via a cable.

In a normal operating mode, rotary encoders are often supplied with electrical energy via the network. In the event that this supply is interrupted, the rotary encoders are able to switch to a second operating mode in which they are supplied by another redundant voltage source, for instance, a battery. Example embodiments of the present invention are especially suitable for rotary encoders in which a switchover from a first operating mode to a second operating mode is possible, the electric power consumption of the rotary encoder in the second operating mode being less than in the first operating mode. The rotary encoder is configured for the second operating mode, e.g., the first group of components is configured such that, triggered by the occurrence of the voltage pulse, in the second operating mode, a voltage from a voltage source is able to be applied to the circuit configuration, and the circuit configuration is disconnectable again from this voltage source at the latest after the storage of the position information in the non-volatile memory.

The position information represents the information about the relative position, thus about the angular position of the first group of components relative to the second group of components, and, for example, may be specified in angular degrees. The first group of components may take the form of a stator, and the second group of components may be in the form of a rotor.

The first group of components may be configured such that the pulse wire is connected in parallel to the voltage source in a manner that the voltage pulse of the pulse wire contributes, together with the energy of the voltage source, to the energy supply of the circuit configuration.

The first group of components may include an emitter by which an electromagnetic field is able to be generated that is able to be modulated by the at least one code element, so that a signal is able to be generated as a function of the relative position of the code element with respect to the at least one detector. In this context, the first group of components is configured such that, triggered by the occurrence of the voltage pulse, a voltage from a voltage source is able to be applied to the emitter, and the emitter is disconnectable again from the voltage source at the latest after the storage of the position information in the non-volatile memory.

The emitter may include an exciter winding by which an electromagnetic field is able to be generated, the at least one detector being implemented as a receiver winding. In this arrangement, the rotary encoder operates according to an inductive measuring principle. Alternatively, a capacitive or optical rotary encoder may be provided. In the case of an optical rotary encoder, the emitter may include a light source, and the at least one detector may be implemented as a photoelement.

The first group of components may be configured such that, triggered by the occurrence of the voltage pulse, a voltage from a voltage source is able to be applied to the at least one detector, and the detector is disconnectable again from the voltage source. In this manner, not only is the operating time of the circuit configuration including the logic circuit and the non-volatile memory minimized, but the time the at least one detector is switched on is also reduced to a minimum.

The at least one code element may be implemented as a magnet, and the at least one detector may be arranged as an MR element or Hall element.

Example embodiments of the present invention relate to rotary encoders which are configured such that the voltage pulse of the pulse wire makes no contribution to the actual determination of the position information in the narrower sense, but rather is only relevant with respect to the switching-in of the voltage source for the energy supply. However, in a modification of this implementation, the rotary encoder may also be configured such that, in addition, the occurrence of the voltage pulse is used together with the signal of a detector for determining the position information, e.g., for recognizing direction.

Example embodiments of the present invention relate to a method for operating a rotary encoder, in which the rotary encoder includes a first group of components and a second group components, and the groups of components are arranged in a manner allowing relative rotation about an axis. The first group of components has a pulse wire, at least one detector, as well as an electronic circuit configuration including a logic circuit and a non-volatile memory. The second group of components has a magnet and at least one code element. In response to the approach of the magnet to the pulse wire, a voltage pulse is generated by the pulse wire. Thereupon, depending on the relative position of the code element with respect to the at least one detector, the detector generates a signal. Based on the signal of the detector, the logic circuit then ascertains position information which, in the next step, is stored in the non-volatile memory. The occurrence of the voltage pulse causes a voltage from a voltage source to be applied to the circuit configuration, the circuit configuration being disconnected again from the voltage source at the latest after the storage of the position information in the non-volatile memory.

The rotary encoder may switch automatically from the first operating mode to the second operating mode, the method hereof being used in the second operating mode.

Often, a second group of components may have code elements in a plurality of scale-division tracks that are of different fineness, and therefore supply different numbers of signal periods per one relative revolution when scanned by the detectors. In a variant hereof, the rotary encoder is configured such that in the operating mode in which a voltage from the voltage source is able to be applied to the circuit configuration, only that scale-division track is able to be scanned which supplies the lowest number of signal periods per one relative revolution. According to a modification, to increase the measuring accuracy, a plurality of scale-division tracks may also be scannable in the specified state.

Further features and aspects of example embodiments of the present invention are described in more detail below with reference to the appended Figures.

DETAILED DESCRIPTION

Figure 1:
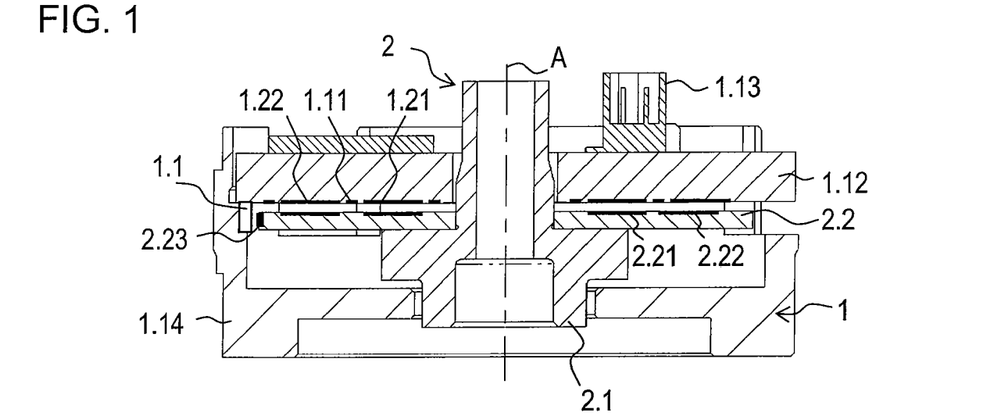
FIG. 1 is a cross-sectional view through a rotary encoder.

FIG. 1 is a cross-sectional view through a rotary encoder according to an example embodiment of the present invention. The rotary encoder includes a first group of components, e.g., which function as a stator 1, and a second group of components, e.g., which function as a rotor 2. Rotor 2 and stator 1 are disposed in a manner allowing rotation relative to each other about an axis A.

Stator 1 includes a housing 1.14, on which an annular scanning printed circuit board 1.12 is secured. Among other things mounted on scanning printed circuit board 1.12 is a pin-and-socket connector 1.13, by which signals and electric power are able to be transmitted between the rotary encoder and sequential electronics. According to FIG. 4, also disposed on scanning printed circuit board 1.12 is a pulse wire 1.1, also referred to as a Wiegand wire, and components of an electronic circuit configuration 1.5, as well as an exciter circuit 1.10. Moreover, a voltage source in the form of a battery 1.7 is located on scanning printed circuit board 1.12.

Figure 3:
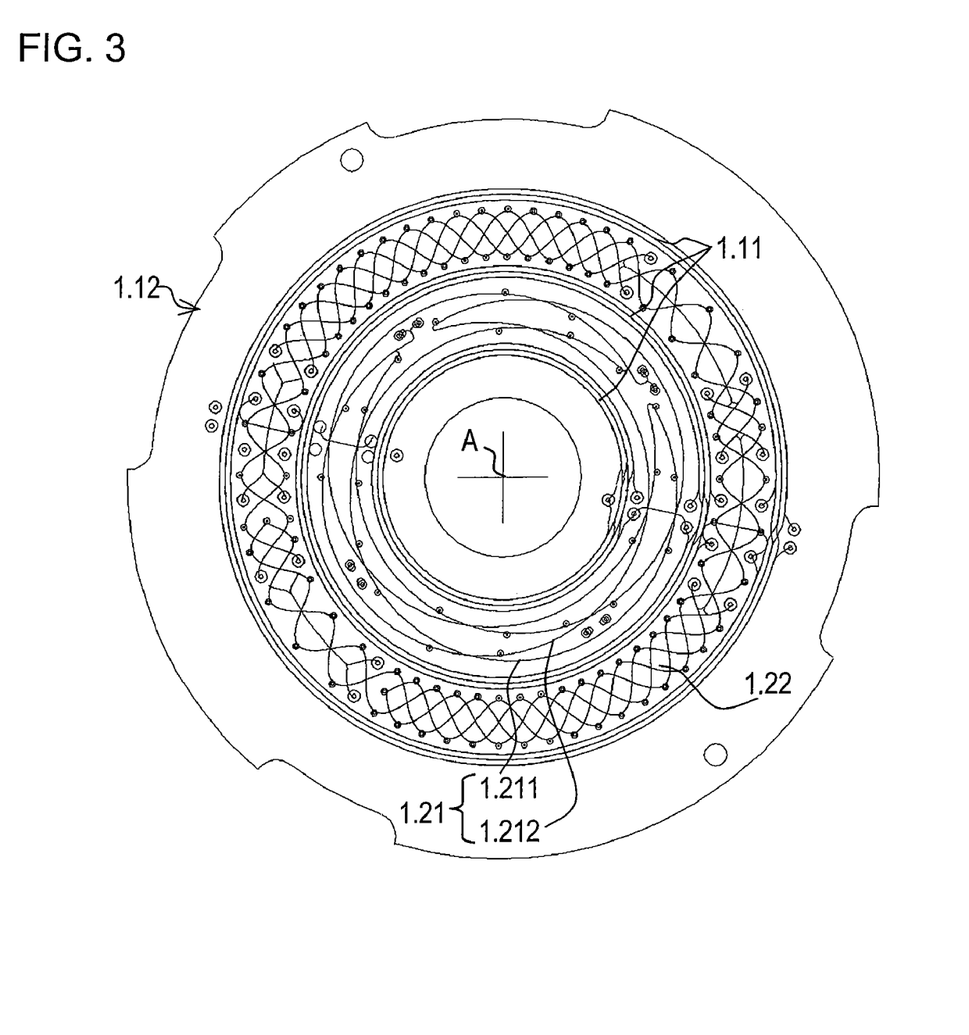
FIG. 3 is a plan view of a scanning printed circuit board.

In addition, according to FIG. 3, provided as exciter windings or as an emitter on the other side of scanning printed circuit board 1.12 are exciter printed conductors 1.11 which are applied on an inner, a middle, and an outer exciter track. Scanning printed circuit board 1.12 itself has a centric bore hole and is multilayered. Scanning printed circuit board 1.12 is used as a support member for detectors, which include different receiver windings 1.21, 1.22. Inner receiver windings 1.21 include a first receiver printed conductor 1.211 and a second receiver printed conductor 1.212. Within one revolution, both first receiver printed conductor 1.211 and second receiver printed conductor 1.212 in each instance supply one signal period, the signal of first receiver printed conductor 1.211 being shifted by 90° with respect to that of second receiver printed conductor 1.212.

Outer receiver windings 1.22 include two receiver printed conductors, and are implemented such that they supply two signals which are shifted by 90°, and which include sixteen signal periods per revolution.

In the exemplary embodiment described, rotor 2 includes a shaft 2.1 which, for example, may be mounted in rotationally fixed manner at a motor shaft to be measured. To record the relative position, e.g., the angular position of shaft 2.1, a code element, e.g., in the form of a code disk 2.2, having scale-division tracks 2.21, 2.22 is secured in rotationally fixed manner on a shoulder of shaft 2.1.

Figure 2:
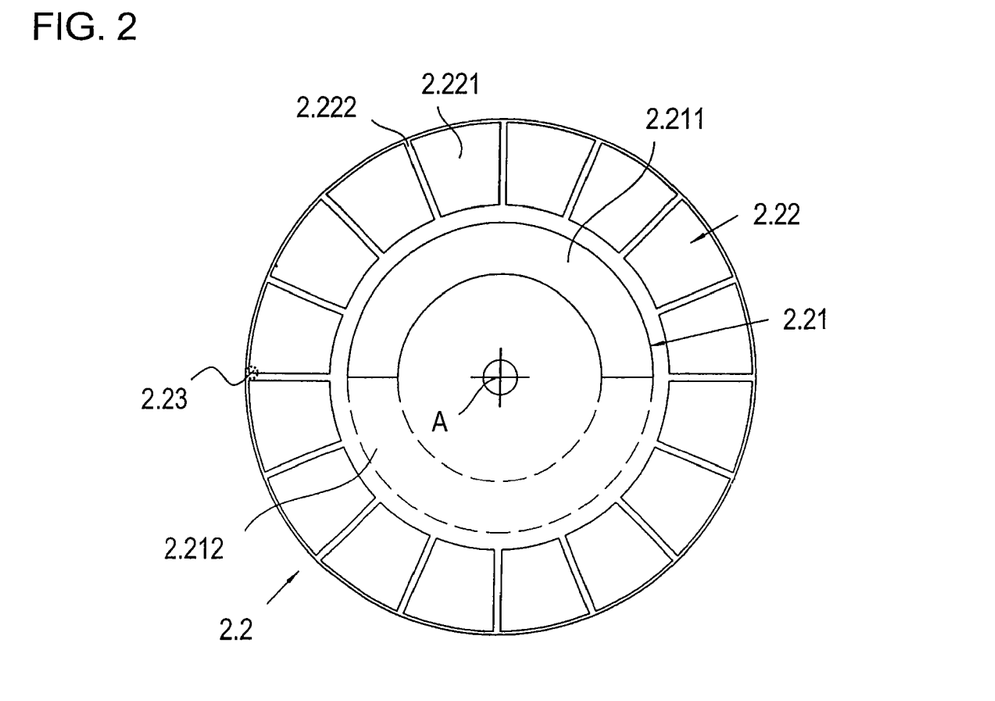
FIG. 2 is a plan view of a code disk.

FIG. 2 is a top view of code disk 2.2. Code disk 2.2 includes a substrate which, in the exemplary embodiment shown, is produced from epoxy resin, and on which two scale-division tracks 2.21, 2.22 are arranged. Scale-division tracks 2.21, 2.22 are ring-shaped and are arranged concentrically with respect to axis of rotation A and with different diameters on the substrate. The two scale-division tracks 2.21, 2.22 are each made up of a periodic sequence of electrically conductive scale-division regions 2.211, 2.221 and non-conductive scale-division regions 2.212, 2.222 in alternation. In the example illustrated, copper is applied on the substrate as the material for electrically conductive scale-division regions 2.211, 2.221. On the other hand, in non-conductive scale-division regions 2.212, 2.222, the substrate is not coated.

In the example embodiment illustrated, inner scale-division track 2.21 includes a first semicircular scale-division region 2.211 having an electrically conductive material, e.g., copper, as well as a second semicircular scale-division region 2.212 in which there is no conductive material.

Second scale-division track 2.22 is arranged radially adjacent to first scale-division track 2.21 on the substrate, scale-division track 2.22 including a plurality of electrically conductive scale-division regions 2.221 and non-conductive scale-division regions 2.222 disposed in between. Material-wise, the different scale-division regions 2.221, 2.222 are formed the same manner as scale-division regions 2.211, 2.212 of first scale-division track 2.21. In total, second scale-division track 2.22 in the exemplary embodiment illustrated includes sixteen periodically arranged, electrically conductive scale-division regions 2.221, and correspondingly, sixteen non-conductive scale-division regions 2.222 disposed in between.

Code disk 2.2 further has a magnet 2.23 which is arranged at the edge of code disk 2.2 and is magnetized in a direction parallel to axis A.

In the assembled state of the rotary encoder, code disk 2.2 and scanning printed circuit board 1.12 are at an axial distance opposite each other, so that axis A extends through the midpoints of both components, and in response to a relative rotation between code disk 2.2 and scanning printed circuit board 1.12, signals $\Sigma_{1.211}$, $\Sigma_{1.212}$ dependent on the respective angular position are able to be generated due to induction effects. Moreover, pulse wire 1.1 and magnet 2.23 are arranged relative to each other such that, upon approach of magnet 2.23 to pulse wire 1.1, a voltage pulse Π is able to be generated by pulse wire 1.1. Alternatively, magnet 2.23 may also be secured directly on shaft 2.1, in which case pulse wire 1.1 would be arranged in the radially inner region of the rotary encoder. Furthermore, the magnet may also be mounted radially on the lower side (based on FIG. 1) of code disk 2.2. In modification of the exemplary embodiment described, the pulse wire may be mounted on housing 1.14 below (FIG. 1) code disk 2.2, and brought into electrical contact with scanning printed circuit board 1.12.

A prerequisite for the formation of corresponding signals $\Sigma_{1.211}$, $\Sigma_{1.212}$ is that exciter printed conductors 1.11 generate or emit an electromagnetic exciter field, alternating in time, in the region of the scanning tracks or in the region of scale-division tracks 2.21 and 2.22 scanned by them. In the exemplary embodiment illustrated, exciter printed conductors 1.11 are in the form of a plurality of planar-parallel individual printed conductors. If an excitation current flows in the same direction through all exciter printed conductors 1.11, then an electromagnetic field oriented in the shape of a tube or cylinder forms around respective exciter printed conductors 1.11. The lines of force of the resulting electromagnetic field extend in the form of concentric circles about exciter printed conductors 1.11, the direction of the lines of force being dependent in a conventional manner on the direction of current flow in exciter printed conductors 1.11. In this context, the direction of current flow of exciter printed conductors 1.11 directly adjacent to a scanning track in common, i.e., the corresponding interconnection of exciter printed conductors 1.11 should be selected to be opposite, so that the lines of force in the area of scale-division tracks 2.21, 2.22 are identically oriented in each instance.

Figure 4:
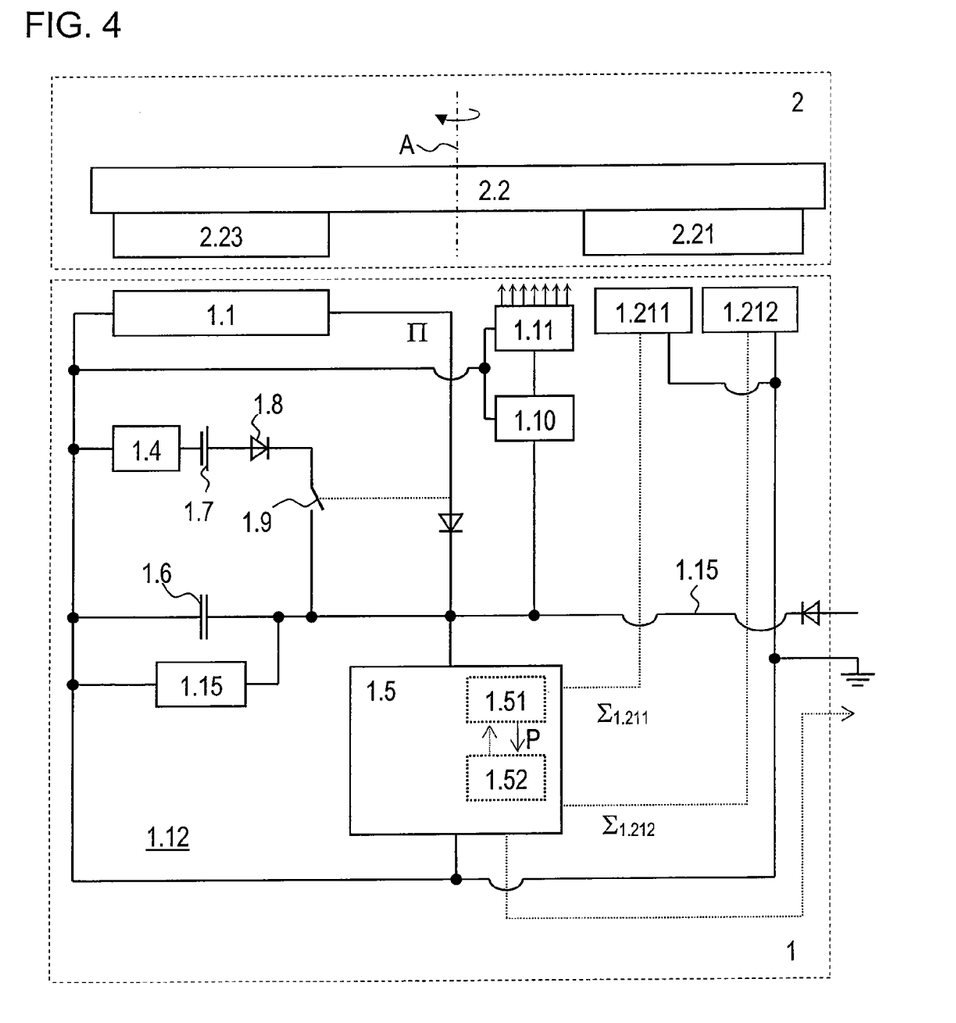
FIG. 4 is a schematic view of a circuit layout of an inductive rotary encoder.

In a first operating mode, which corresponds to the normal operation, the rotary encoder is supplied with current from outside via a cable and pin-and-socket connector 1.13, so that the externally supplied current flows through line 1.15 (see, e.g., FIG. 4). In this first operating mode, exciter circuit 1.10 is constantly supplied with current, so that an excitation current constantly flows through exciter printed conductors 1.11 as well, regardless of whether shaft 2.1 is rotating or is standing still. Signals $\Sigma_{1.211}$ and $\Sigma_{1.212}$ of receiver printed conductors 1.211 and 1.212 are continuously picked up by electronic circuit configuration 1.5 and processed in a logic circuit 1.51. From logic circuit 1.51, which also detects direction, position information P is transferred to a non-volatile memory 1.52 and stored there. A ferroelectric random access memory (FRAM or FeRAM) may be used as non-volatile memory 1.52. As an alternative, a magneto-resistive random access memory (MRAM) may also be used. In principle, non-volatile memory 1.52 should have the capability of being rewritten many times.

It may happen that for some reason, the external network current supply is not available or is interrupted. In this case, the rotary encoder is automatically shifted to a second operating mode, in which the rotary encoder is temporarily supplied with electrical energy by a voltage source, e.g., in the form of a battery 1.7. In this state, in view of the service life of battery 1.7, it is imperative that the energy consumption be as low as possible, and it is particularly important that at least a rough relative position may continue to be recorded. For this reason, operation is restricted, e.g., to the scanning of inner scale-division tracks 2.21 by receiver printed conductors 1.211, 1.212. When shaft 2.1 or rotor 2 is standing still, a switch 1.9, implemented as a transistor, for example, remains open and battery 1.7 is not discharged. Position information P originally stored in non-volatile memory 1.52 is retained. The second operating mode often commences when the network has failed. In this case, usually shaft 2.1 or the drive secured to it will also come to a stop.

However, it may also be that shaft 2.1 will continue to turn, for instance, under the influence of loads at the drive in question. As soon as magnet 2.23 approaches pulse wire 1.1, pulse wire 1.1 generates a voltage pulse Π. When voltage pulse Π reaches a predefined voltage threshold, switch 1.9 is caused to close, so that battery 1.7 supplies current via a diode 1.8. Incidentally, the other terminal of battery 1.7 is connected via a resistor 1.4 to the zero potential. The current of battery 1.7, increased by voltage pulse Π from pulse wire 1.1, is used to charge a buffer capacitor 1.6, the maximally occurring voltage being limited by a voltage limiter 1.15. Exciter circuit 1.10 as well as electronic circuit configuration 1.5 are operated by the current. Exciter circuit 1.10 injects an excitation current, which may also be in the form of a pulse, into exciter printed conductors 1.11. Depending on the relative position of code disk 2.2 with respect to receiver printed conductors 1.211, 1.212, corresponding signals $\Sigma_{1.211}$ and $\Sigma_{1.212}$ are generated by receiver printed conductors 1.211, 1.212. These signals $\Sigma_{1.211}$, $\Sigma_{1.212}$ are conducted to circuit configuration 1.5 and processed there in logic circuit 1.51, taking a direction-recognizing algorithm into consideration. Position information P is thereupon transferred by logic circuit 1.51 to a non-volatile memory 1.52 and stored there. After voltage pulse Π has decayed again, that is, after voltage pulse Π has dropped below a predefined voltage threshold, switch 1.9 opens again, and battery 1.7 no longer discharges. In other words, among other things, circuit configuration 1.5 is disconnected again from voltage source 1.7 at the latest after the storage of position information P in non-volatile memory 1.52. In this context, however, switch 1.9 may also already be opened prior to the storage of position information P in non-volatile memory 1.52 if, for instance, buffer capacitor 1.6 is able to make the energy available for storing position information P in non-volatile memory 1.52.

In particular, due to this device and the method described, a demand is thus only placed on battery 1.7 when a relevant event, e.g., a movement of shaft 2.1 occurs. Especially because pulse wire 1.1 is connected in parallel to voltage source 1.7, pulse wire 1.1 contributes to the energy supply of circuit configuration 1.5. Moreover, the charge draining off from battery 1.7 is minimized, because the energy of voltage pulse Π is switched in as assistance. Buffer capacitor 1.6 limits the maximally occurring voltage, and still makes electric current available if switch 1.9 should already be closed again.

Figure 5:
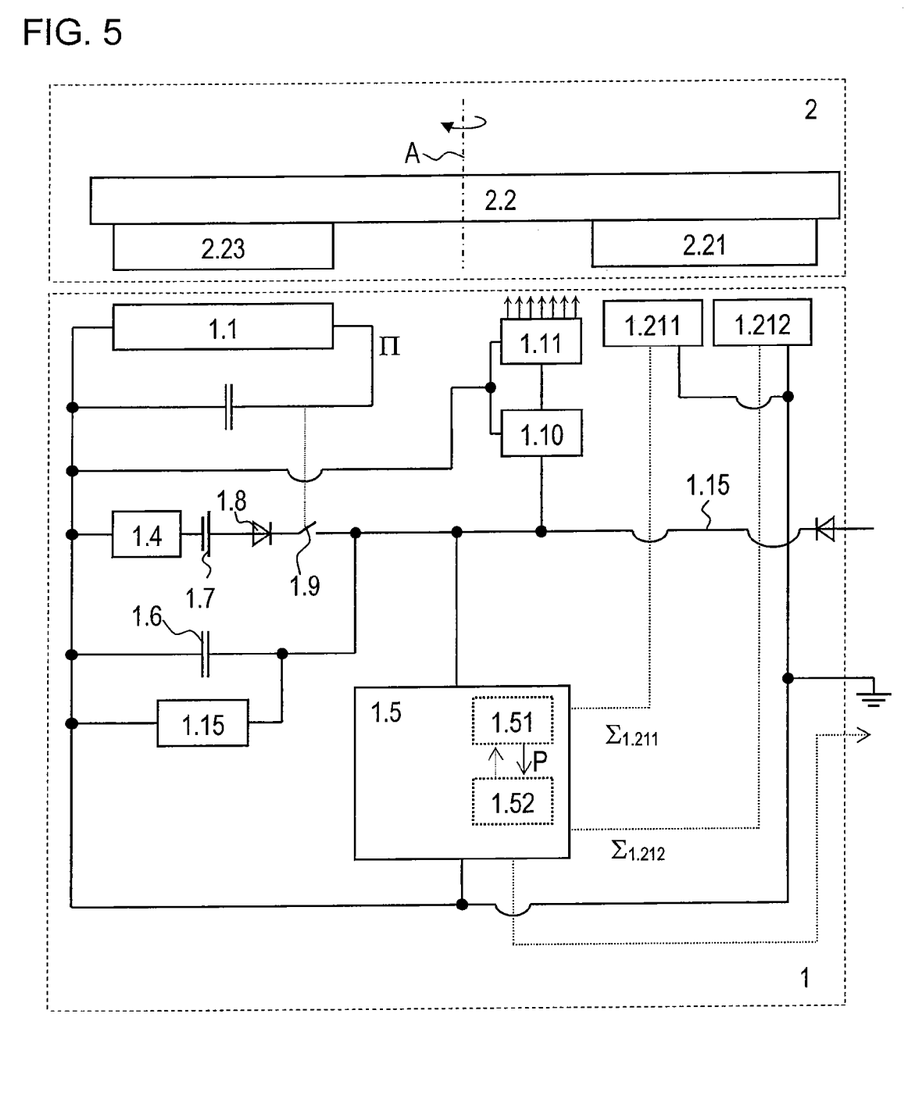
FIG. 5 is a schematic view of a circuit layout of a rotary encoder.

FIG. 5 illustrates a further exemplary embodiment which differs from that previously described due to a simplified circuitry. In this example, voltage pulse Π of pulse wire 1.1 no longer contributes to the energy supply of the rotary encoder, but rather is used substantially only for driving switch 1.9. Alternatively, the circuitry may be simplified still further by omitting buffer capacitor 1.6. The circuitry simplifications mentioned are also usable for the exemplary embodiments described below.

According to a further exemplary embodiment, an optical rotary encoder or optical shaft encoder may be provided. A suitable circuitry is illustrated schematically in FIG. 6. The exciter circuit is implemented as a driver circuit 1.10' for a light source 1.11' that is used as an emitter. The light from light source 1.11' strikes an optical scale division 2.21' and is modulated as a function of the angular position of shaft 2.1 or of the relative position of scale division 2.21' with respect to photoelements 1.211', 1.212'. The modulated light is received by the two photoelements 1.211', 1.212' and converted into electrical signals $\Sigma_{1.211'}$, $\Sigma_{1.212'}$. Photoelements 1.211', 1.212' are arranged geometrically such that signals $\Sigma_{1.211'}$, $\Sigma_{1.212'}$ are phase-shifted by 90°.

Figure 6:
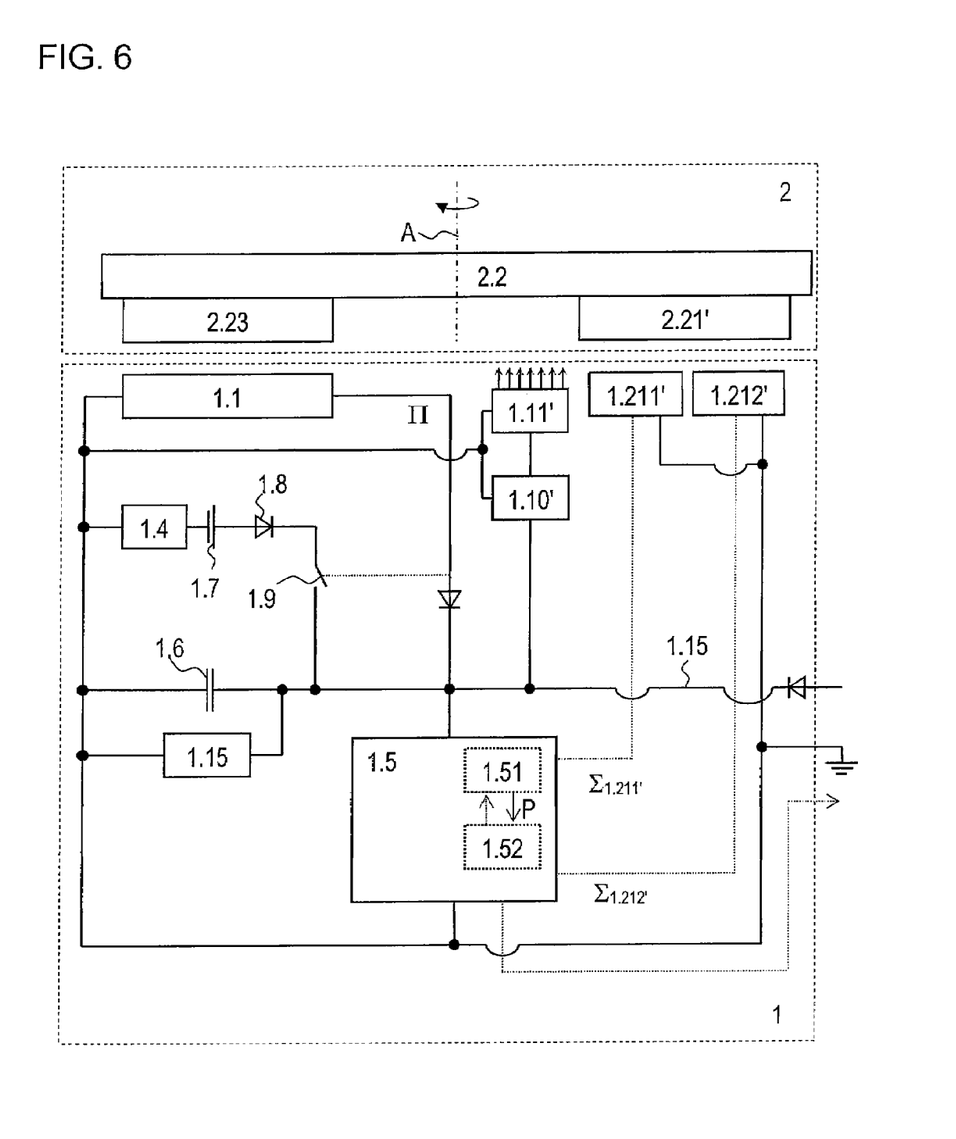
FIG. 6 is a schematic view of a circuit layout of an optical rotary encoder.

When the external power supply is not available, the rotary encoder switches over to a second operating mode as well, utilizing battery 1.7 as a voltage source. If shaft 2.1 or rotor 2 is at a standstill, switch 1.9 remains open as well, and no demand is placed on battery 1.7. Position information P originally stored in non-volatile memory 1.52 is retained.

As soon as shaft 2.1 rotates and magnet 2.23 approaches pulse wire 1.1, pulse wire 1.1 generates a voltage pulse Π, as already described above. Voltage pulse Π triggers the closing of switch 1.9, so that battery 1.7, assisted by the energy content of voltage pulse Π from pulse wire 1.1, outputs current, e.g., to driver circuit 1.10' and electronic circuit configuration 1.5.

Driver circuit 1.10' causes light source 1.11' to emit a light pulse. Photoelements 1.211', 1.212' generate corresponding signals $\Sigma_{1.211'}$ and $\Sigma_{1.212'}$ as a function of the relative position of optical scale division 2.21' with respect to photoelements 1.211', 1.212'. These signals $\Sigma_{1.211'}$, $\Sigma_{1.212'}$ are conducted to circuit configuration 1.5 and are processed there in logic circuit 1.51, taking a direction-recognizing algorithm into consideration. Position information P is thereupon transferred by logic circuit 1.51 to a non-volatile memory 1.52 and stored there. After voltage pulse Π has decayed again, switch 1.9 opens again, and battery 1.7 no longer discharges.

Figure 7:
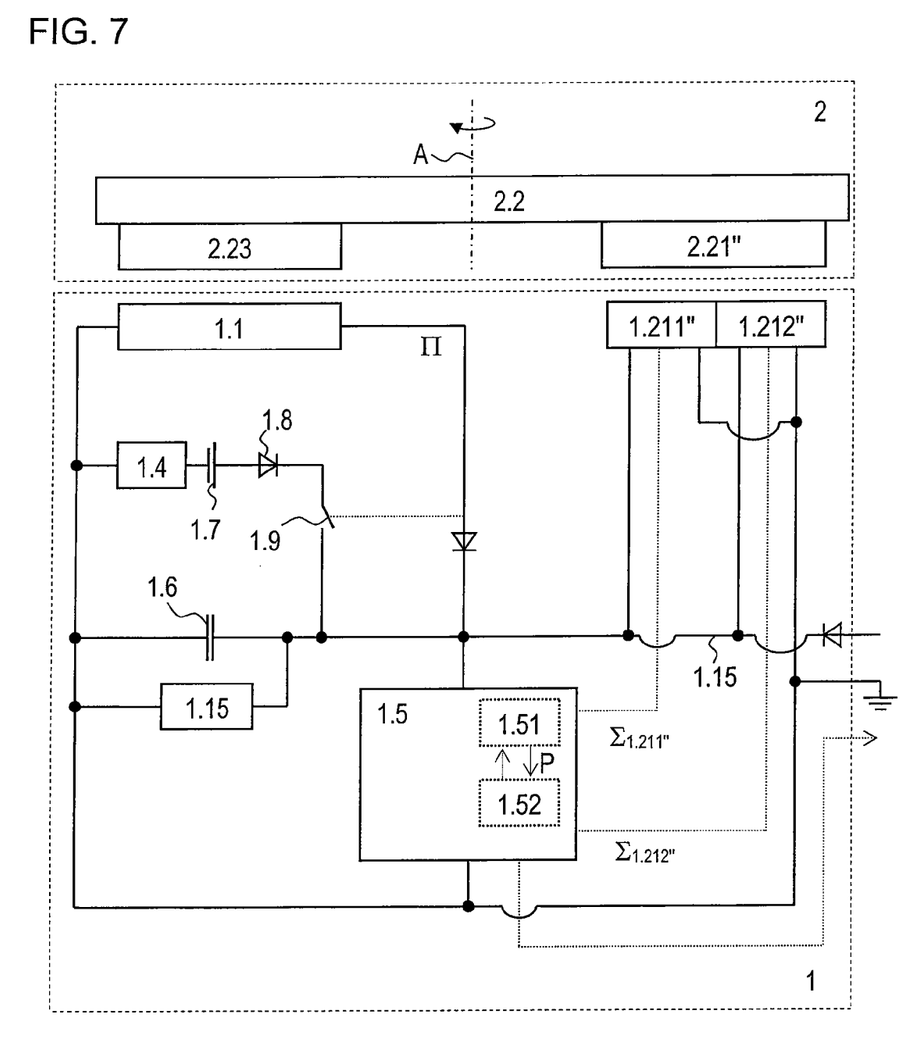
FIG. 7 is a schematic view of a circuit layout of a rotary encoder functioning magnetically.

FIG. 7 illustrates a further exemplary embodiment. In contrast to the previous exemplary embodiments, active receiver elements in the form of MR sensors 1.211", 1.212' are provided on stator 1. Opposite these MR sensors 1.211", 1.212" is a magnetic scale-division track 2.21". This scale-division track 2.21" may either be made of one piece of magnetizable material that exhibits a predefined magnetization pattern, or else may be made up of individual separate magnets. MR sensors 1.211", 1.212" generate signals $\Sigma_{1.211"}$, $\Sigma_{1.212"}$ that are a function of the relative position between code disk 2.2 and stator 1. The functioning method for the case that the external power supply is not available is analogous to the examples described above. However, in this case, the electrical energy is also used for the operation of MR sensors 1.211", 1.212". No electromagnetic field or light must be generated.

Incidentally, in all the exemplary embodiments described above, the occurrence of voltage pulse Π may additionally be taken into account in electronic circuit configuration 1.5 for determining the angular position or relative position between code disk 2.2 and stator 1. In this case, the number of detectors may be reduced.

What is claimed is:

1. A rotary encoder, comprising:
   a first group of components and a second group of components, the groups of components rotatable relative to each other about an axis, the first group of components including a pulse wire, at least one detector, and an electronic circuit configuration having a logic circuit and a non-volatile memory, the second group of components including a magnet and at least one code element;
   wherein the pulse wire is configured to generate a voltage pulse in response to an approach of the magnet to the pulse wire;
   wherein the detector is configured to generate a signal depending on a relative position of the code element with respect to the detector;
   wherein the logic circuit is configured to ascertain position information based on the signal;
   wherein the non-volatile memory is configured to store the position information;
   wherein the first group of components is configured such that, triggered by an occurrence of the voltage pulse, a voltage from a voltage source is applied to the circuit configuration, and the circuit configuration is disconnectable from the voltage source at the latest after storage of the position information in the non-volatile memory.

2. The rotary encoder according to claim 1, wherein the first group of components is configured such that the pulse wire is connected in parallel to the voltage source so that the voltage pulse of the pulse wire contributes to an energy supply of the circuit configuration.

3. The rotary encoder according to claim 1, wherein the first group of components includes an emitter configured to generate an electromagnetic field modulatable by the code element, and the emitter, triggered by the occurrence of the voltage pulse, is acted upon by the voltage from the voltage source and is disconnectable from the voltage source at the latest after the storage of the position information in the non-volatile memory.

4. The rotary encoder according to claim 3, wherein the emitter includes an exciter winding configured to generate an electromagnetic field, and the detector includes a receiver winding.

5. The rotary encoder according to claim 3, wherein the emitter includes a light source, and the detector includes a photoelement.

6. The rotary encoder according to claim 1, wherein the first group of components is configured such that, triggered by the occurrence of the voltage pulse, the detector is acted upon by the voltage from the voltage source and is disconnected from the voltage source.

7. The rotary encoder according to claim 6, wherein the code element includes a magnet, and the detector includes at least one of (a) an MR element and (b) a Hall element.

8. The rotary encoder according to claim 1, wherein the voltage source includes at least one of (a) a battery and (b) a temporary voltage source.

9. The rotary encoder according to claim 1, wherein the rotary encoder is operable in a first operating mode and a second operating mode;
   wherein, in the first operating mode, the rotary encoder is supplied with voltage from a main voltage source; and
   wherein, in the second operating mode, the rotary encoder not supplied with voltage from the main voltage source, and the voltage from the voltage source is applied to the circuit configuration.

10. The rotary encoder according to claim 9, wherein the rotary encoder is automatically switchable from the first operating mode to the second operating mode in response to an interruption of the main voltage source.

11. A method for operating a rotary encoder including a first group of components and a second group of components, the groups of components rotatable relative to each other about an axis, the first group of components including a pulse wire, at least one detector, and an electronic circuit configuration having a logic circuit and a non-volatile memory, the second group of components including a magnet and at least one code element, comprising:
   generating a voltage pulse by the pulse wire in response to an approach of the magnet to the pulse wire;
   generating a signal by the detector depending on a relative position of the code element with respect to the detector;
   ascertaining position information by the logic circuit based on the signal;
   storing the position information in the non-volatile memory;
   triggered by an occurrence of the voltage pulse, applying a voltage from a voltage source to the circuit configuration; and
   disconnecting the circuit configuration from the voltage source at the latest after storing the position information in the non-volatile memory.

12. The method according to claim 11, wherein the first group of components is configured such that the pulse wire is connected in parallel to the voltage source, so that the voltage pulse of the pulse wire contributes to the energy supply of the circuit configuration.

13. The method according to claim 11, wherein the first group of components includes an emitter configured to generate an electromagnetic field that is modulated by the code element, the voltage from the voltage source applied in the applying step to the emitter, the emitted disconnected in the disconnecting step from the voltage source at the latest after the storing of the position information in the non-volatile memory.

14. The method according to claim 13, wherein the emitter includes an exciter winding by which the electromagnetic field is generatable, and the detector includes a receiver winding.

15. The method according to claim 13, wherein the emitter includes a light source, and the detector includes a photoelement.

16. The method according to claim 11, wherein the voltage from the voltage source is applied in the applying step to the detector, and the voltage source is disconnected from the detector in the disconnecting step.

17. The method according to claim 11, wherein the code element includes a magnet, and the detector includes at least one of (a) an MR element and (b) a Hall element.

18. The method according to claim 11, wherein the voltage source includes at least one of (a) a battery and (b) a temporary voltage source.

19. The method according to claim 11, further comprising operating the rotary encoder in a first operating mode and operating the rotary encoder in second operating mode;
   wherein, in the first operating mode, the rotary encoder is supplied with voltage from a main voltage source; and
   wherein, in the second operating mode, the rotary encoder is not supplied with voltage from the main voltage source, and the voltage from the voltage source is applied to the circuit configuration.

20. The method according to claim 19, further comprising automatically switching from the first operating mode to the second operating mode in response to an interruption of the main voltage source.

* * * * *

UNITED STATES PATENT AND TRADEMARK OFFICE
CERTIFICATE OF CORRECTION

PATENT NO. : 7,439,734 B2
APPLICATION NO. : 12/033459
DATED : October 21, 2008
INVENTOR(S) : Peter Fischer Page 1 of 1

It is certified that error appears in the above-identified patent and that said Letters Patent is hereby corrected as shown below:

Title page:

Item (73) Assignee, correct the Assignee from "Johannes Heidenhain GmbH" to --Dr. Johannes Heidenhain GmbH--.

Signed and Sealed this

Sixteenth Day of December, 2008

JON W. DUDAS
*Director of the United States Patent and Trademark Office*